United States Patent
Tarukawa

(10) Patent No.: US 7,798,207 B2
(45) Date of Patent: Sep. 21, 2010

(54) AIR CONDITIONER WITH GUIDE STRUCTURE FOR VEHICLES

(75) Inventor: Yuichi Tarukawa, Date (JP)

(73) Assignee: Keihin Corporation, Tokyo (JP)

( * ) Notice: Subject to any disclaimer, the term of this patent is extended or adjusted under 35 U.S.C. 154(b) by 977 days.

(21) Appl. No.: 11/523,923

(22) Filed: Sep. 19, 2006

(65) Prior Publication Data

US 2007/0062683 A1  Mar. 22, 2007

(30) Foreign Application Priority Data

Sep. 20, 2005 (JP) .............................. 2005-271800

(51) Int. Cl.
- B60H 1/00 (2006.01)
- B60H 1/02 (2006.01)
- B61D 27/00 (2006.01)
- F28F 27/00 (2006.01)
- F28F 27/02 (2006.01)

(52) U.S. Cl. .......................... 165/202; 165/42; 165/43; 165/204; 165/96; 165/100; 165/103; 454/160; 454/161

(58) Field of Classification Search .................. 165/42, 165/43, 202, 203, 204, 96, 100, 103; 454/160, 454/161

See application file for complete search history.

(56) References Cited

U.S. PATENT DOCUMENTS

| | | | |
|---|---|---|---|
| 4,852,638 A | 8/1989 | Hildebrand et al. | |
| 4,972,992 A | 11/1990 | Scheidel et al. | |
| 6,106,386 A | 8/2000 | Schwarz | |
| 6,386,966 B1 | 5/2002 | Kuwayama et al. | |
| 6,889,761 B2 | 5/2005 | Perry et al. | |
| 2005/0039903 A1 | 2/2005 | Kusaka | |
| 2005/0178538 A1* | 8/2005 | Vincent | 165/203 |

FOREIGN PATENT DOCUMENTS

| | | |
|---|---|---|
| DE | 19881087 T1 | 9/1999 |
| DE | 19908998 A1 | 9/1999 |
| DE | 10031991 A1 | 1/2002 |
| DE | 10147112 A1 | 4/2003 |

(Continued)

OTHER PUBLICATIONS

Japanese Office Action for Application No. 2005-271800, dated Jul. 8, 2008.

(Continued)

*Primary Examiner*—Frantz F Jules
*Assistant Examiner*—Travis Ruby
(74) *Attorney, Agent, or Firm*—Lahive & Cockfield, LLP; Anthony A. Laurentano

(57) ABSTRACT

Cooled air introduced from an evaporator through a first passage in a housing is divided into laminar flows by a guide structure disposed on an air mixing door. The direction of flow of the cooled air is changed upwardly by guide walls of the guide structure and is further changed upwardly by first walls of the guide structure, after which the cooled air is introduced into a mixer. Heated air introduced from a heater core through a third passage is mixed with the cooled air in the mixer. The mixed air is delivered from a face discharge outlet, a defroster discharge outlet, or a foot discharge outlet into a passenger compartment.

7 Claims, 6 Drawing Sheets

FOREIGN PATENT DOCUMENTS

| | | |
|---|---|---|
| EP | 1 312 493 | 5/2003 |
| GB | 2239706 A | 7/1991 |
| JP | 60-215415 | 10/1985 |
| JP | 62-046706 | 2/1987 |
| JP | 62-178418 | 8/1987 |
| JP | 04-095520 | 3/1992 |
| JP | 5-178066 | 7/1993 |
| JP | 10-236134 | 9/1998 |
| JP | 10-264638 | 10/1998 |
| JP | 10-338019 | 12/1998 |
| JP | 11-011135 | 1/1999 |
| JP | 11-342721 | 12/1999 |
| JP | 2000-033814 | 2/2000 |
| JP | 2001-71737 | 3/2001 |
| JP | 2004-203179 | 7/2004 |
| JP | 2004-237940 | 8/2004 |
| JP | 2005-35375 | 2/2005 |

OTHER PUBLICATIONS

CN200610154263.3 Patent cover page with translation.
Japanese Office Action for Application No. 2003-273836, dated Feb. 27, 2007.
Japanese Office Action for Application No. 2005-271800, dated Jul. 7, 2009.

* cited by examiner

AIR CONDITIONER WITH GUIDE STRUCTURE FOR VEHICLES

BACKGROUND OF THE INVENTION

1. Field of the Invention

The present invention relates to a vehicular air conditioner which has a cooling unit, a heating unit, and an air mixing door and which is capable of adjusting the temperature in the passenger compartment of a vehicle with the cooling unit and the heating unit.

2. Description of the Related Art

Vehicular air conditioners installed on vehicles adjust the temperature and humidity in the passenger compartment by mixing air cooled by an evaporator and air heated by a heater core with each other at a desired mixing ratio and thereafter delivering the mixed air from a defroster outlet, a face outlet, or a foot outlet into the passenger compartment. To make passengers feel comfortable in the passenger compartment, it is necessary to mix the cooled air and the heated air into as appropriate air as possible.

The present applicant has proposed a vehicular air conditioner having a mechanism for mixing cooled air and heated air appropriately with each other and supplying the mixed air to the passenger compartment (see Japanese Laid-Open Patent Publication No. 2005-35375). In the vehicular air conditioner, an air mixing door for dividing air introduced into a housing has a plurality of guides extending along the direction in which the air flows, and the directions in which cooled air and heated air flow are controlled by the guides. The cooled air and the heated air which are controlled by the guides are appropriately mixed with each other, and the mixed air is supplied selectively through a defroster outlet, a face outlet, or a foot outlet into the passenger compartment.

SUMMARY OF THE INVENTION

It is a general object of the present invention to provide a vehicular air conditioner which is capable of reducing the temperature difference between air flows that are simultaneously delivered from a plurality of outlets into a passenger compartment, for thereby making passengers feel more comfortable in the passenger compartment.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
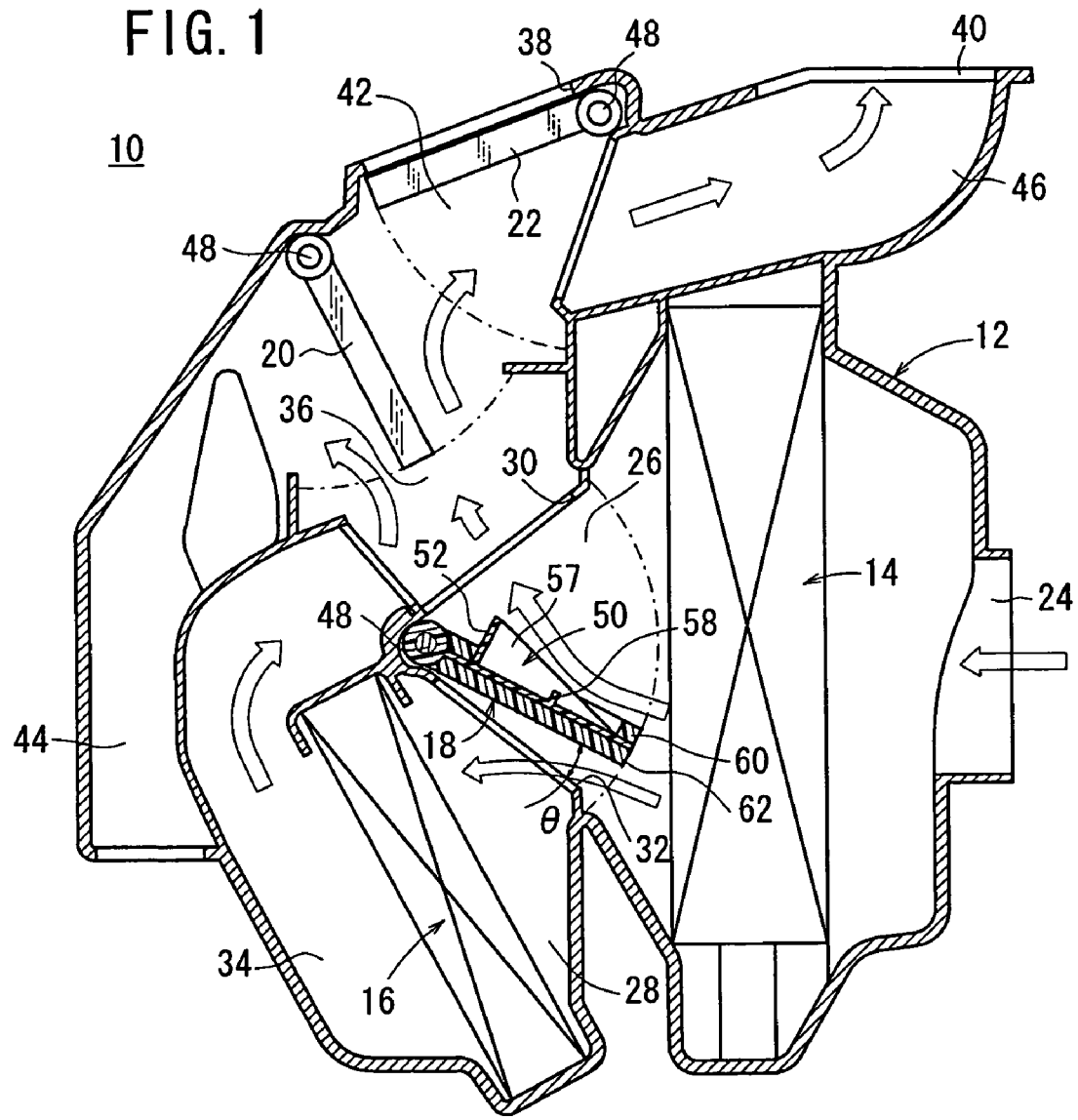
FIG. 1 is a vertical cross-sectional view of a vehicular air conditioner according to an embodiment of the present invention.

FIG. 1 shows in vertical cross section a vehicular air conditioner 10 according to an embodiment of the present invention.

As shown in FIG. 1, the vehicular air conditioner 10 has a housing 12 defining various passages of air therein, an evaporator (cooling unit) 14 disposed in the housing 12 for cooling air, a heater core (heating unit) 16 disposed in the housing 12 for heating air, an air mixing door 18 for mixing cooled air and heated air which have been adjusted in temperature, with each other at a predetermined mixing ratio to produce mixed air, and first and second discharge outlet doors 20, 22 for selecting outlets for the mixed air.

The housing 12 defines therein an inlet passage 24 disposed upstream of the evaporator 14 for being supplied with air from a blower fan, not shown, and a first passage (cooled air passage) 26 and a second passage (heated air passage) 28 which are disposed downstream of the evaporator 14 and divided from each other by the air mixing door 18. The first passage 26 includes a first opening 30 that has its opening size adjustable by the air mixing door 18. The second passage 28 includes a second opening 32 that has its opening size adjustable by the air mixing door 18. The heater core 16 is disposed downstream of the second passage 28. The housing 12 defines therein a third passage (heated air passage) 34 disposed downstream of the heater core 16 and bent into fluid communication with the first opening 30.

A mixer 36 for mixing the cooled air from the evaporator 14 and the heated air from the heater core 16 with each other is defined in a substantially central region in the housing 12 where the third passage 34 and the first opening 30 are joined to each other. A face passage 42 is provided in fluid communication with the mixer 36, a face discharge outlet 38, and a defroster discharge outlet 40. A foot passage 44 is disposed between the mixer 36 and a foot discharge outlet (not shown) to provide fluid communication between the mixer 36 and the foot discharge outlet.

The first discharge outlet door 20 is disposed in facing relation to the mixer 36 for selectively changing fluid communication between the mixer 36 and the face passage 42 and/or the foot passage 44.

The second discharge outlet door 22 is disposed between the face discharge outlet 38 and a defroster passage 46 that is held in fluid communication with the defroster discharge outlet 40, for selectively changing fluid communication with the face discharge outlet 38 and the defroster discharge outlet 40.

Figure 2:
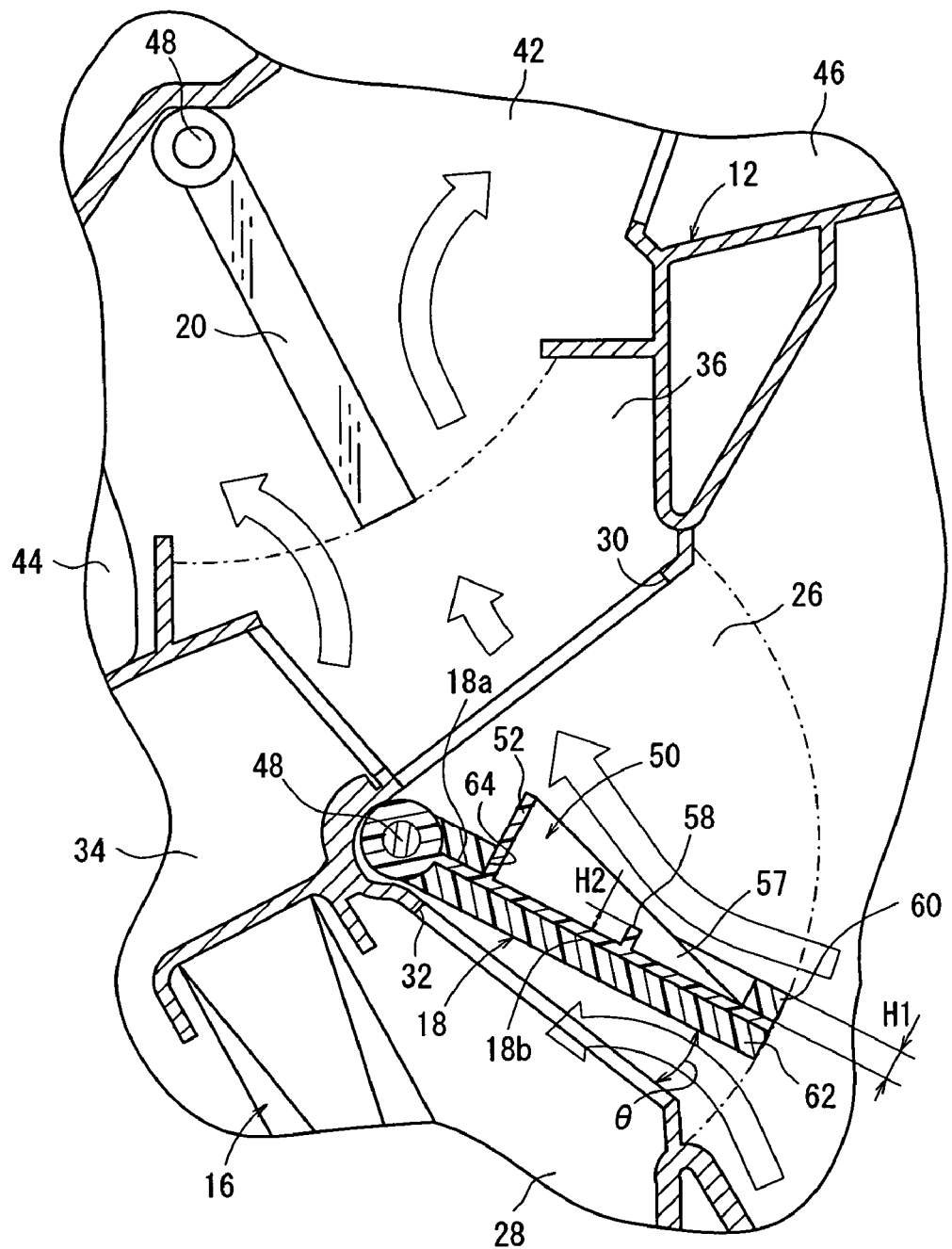
FIG. 2 is an enlarged vertical cross-sectional view of a region near an air mixing door of the vehicular air conditioner shown in FIG. 1.
Figure 3:
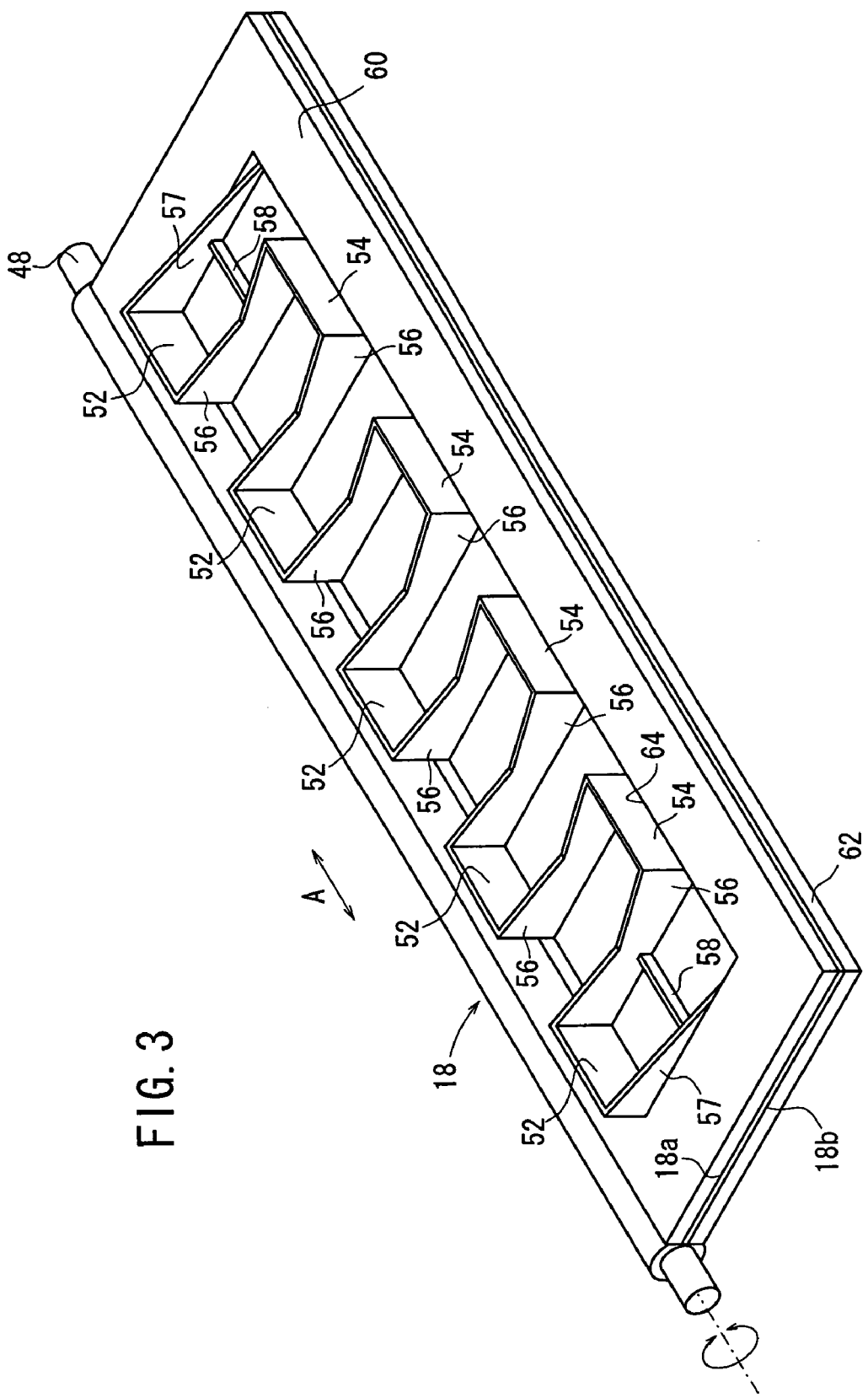
FIG. 3 is a perspective view of the air mixing door of the vehicular air conditioner shown in FIG. 1.

As shown in FIGS. 2 and 3, the air mixing door 18 is angularly movable about a shaft 48 mounted in the housing 12. The air mixing door 18 has a guide structure 50 projecting from a first surface 18a which faces the first passage 26. The guide structure 50 comprises a plurality of first walls 52 disposed near the first opening 30, a plurality of second walls 54 (see FIG. 3) disposed near the evaporator 14, a plurality of third walls 56 interconnecting the first walls 52 and the second walls 54 alternately, a pair of fourth walls 57 disposed respectively on the opposite ends of the air mixing door 18 parallel to the third walls 56, and a pair of guide walls 58 disposed in regions surrounded by the first walls 52, the third walls 56, and the fourth walls 57. The guide structure 50 is thus of a labyrinth structure formed by the first walls 52, the second walls 54, the third walls 56, and the fourth walls 57.

The first walls 52 serve to change the direction of the cooled air led from the first passage 26 toward the mixer 36. The second walls 54 serve to change the direction of the heated air led from the third passage 34 toward the mixer 36.

The third walls 56 extend in a direction substantially perpendicular to the longitudinal direction (indicated by the arrow A in FIG. 3) of the air mixing door 18, and lie substantially parallel to each other at spaced intervals. The third walls 56 are of such a shape that the distance that the third walls 56 project from the first surface 18a is progressively smaller from the ends thereof which are joined to the first walls 52 and the second walls 54 toward a central area thereof. Stated otherwise, each of the third walls 56 has a substantially V-shaped recess defined centrally in its distal edge remote from the first surface 18a.

The fourth walls 57 are spaced a distance from the respective adjacent third walls 56, and are slanted at such an angle that the distance that the fourth walls 57 project from the first surface 18a is progressively smaller in a direction away from the shaft 48.

Specifically, as shown in FIG. 3, the guide structure 50 has, for example, five first walls 52 spaced at intervals in the longitudinal direction (indicated by the arrow A) of the air mixing door 18, four second walls 54 disposed between the first walls 52, eight third walls 56 interconnecting the ends of the first walls 52 and the ends of the second walls 54, and a pair of fourth walls 57.

The pair of guide walls 58 is disposed in the regions surrounded by the first walls 52, the third walls 56, and the fourth walls 57 at the opposite ends of the air mixing door 18 in the longitudinal direction (indicated by the arrow A).

The guide walls 58 are disposed substantially parallel to the first walls 52 and interconnect the third walls 56 and the fourth walls 57 that are disposed in confronting relation to each other. The guide walls 58 are disposed substantially centrally in the longitudinal direction of the third and fourth walls 56, 57.

A first seal member 60 in the form of a sheet is mounted on the first surface 18a, on which the guide structure 50 is disposed, of the air mixing door 18 in surrounding relation to the guide structure 50. Similarly, a second seal member 62 in the form of a sheet is mounted on a second surface 18b of the air mixing door 18 which faces the second passage 28. The first and second seal members 60, 62 are made of a resilient material such as urethane or the like and have substantially the same thickness as each other. The first and second seal members 60, 62 are mounted respectively on the first and second surfaces 18a, 18b in sandwiching relation to the air mixing door 18 (see FIG. 2). When the air mixing door 18 is turned into abutment against an edge of the first opening 30, the first opening 30 is closed by the first seal member 60, blocking fluid communication between the mixer 36 and the first passage 26. When the air mixing door 18 abuts against an edge of the second opening 32, the second opening 32 is closed by the second seal member 62.

The first seal member 60 has a hole 64 defined substantially centrally therein and having a substantially elongate rectangular shape that is complementary to the shape of the guide structure 50. After the guide structure 50 is inserted through the hole 64, the first seal member 60 is mounted on the first surface 18a in surrounding relation to the guide structure 50. As shown in FIG. 2, the thickness H1 of the first seal member 60 is greater than the height H2 of the guide walls 58 from the first surface 18a of the air mixing door 18 (H1>H2). Specifically, the distance that the guide walls 58 project from the first surface 18a is smaller than the thickness H1 of the first seal member 60 mounted on the first surface 18a, so that the guide walls 58 do not project outwardly from the surface of the first seal member 60.

The second seal member 62 is mounted on the entire surface of the second surface 18b of the air mixing door 18.

The vehicular air conditioner 10 according to the embodiment of the present invention is basically constructed as described above, and operation and advantages of the vehicular air conditioner 10 will be described below.

When the vehicular air conditioner 10 starts to operate, a blower fan, not shown, is rotated to introduce air from the inlet passage 24 into the housing 12. The introduced air is cooled when it passes through the evaporator 14, and is supplied as cooled air to the first passage 26 and/or the second passage 28.

If the air mixing door 18 is angularly positioned as shown in FIGS. 1 and 2, then the cooled air supplied to the first passage 26 is introduced into the mixer 36 through the guide structure 50 on the air mixing door 18. The cooled air supplied to the second passage 28 is heated by the heater core 16 when the cooled air passes through the heater core 16, and the heated air is introduced through the third passage 34 into the mixer 36.

An action of the guide structure 50 to mix the cooled air and the heated air upon angular displacement of the air mixing door 18 will be described below with reference to FIGS. 1, 2, 4, and 5. It is assumed that the air mixing door 18 is angularly moved by an angle of θ with respect to the plane of the second opening 32.

First, as shown in FIG. 2, when the air mixing door 18 is angularly moved by a small angle of θ from the second opening 32 toward the first opening 30, the cooled air introduced from the first passage 26 into the guide structure 50 is divided by the third walls 56 and the fourth walls 57 into laminar flows along the direction in which the cooled air flows. The cooled air flowing between the third walls 56 and the fourth walls 57 is forced by the guide walls 58 on the opposite ends of the air mixing door 18 to flow obliquely upwardly at a certain angle with respect to the first surface 18a. The cooled air that flows along the guide structure 50 is then forced by the first walls 52 to flow further upwardly toward the mixer 36.

Therefore, the cooled air has its direction of flow changed successively upwardly stepwise by the guide walls 58 and the first walls 52 of the guide structure 50, and then is introduced into the mixer 36.

The heated air that flows through the third passage 34 is mixed in the mixer 36 with the cooled air that has flowed through the guide structure 50. The mixed air is then delivered from the face discharge outlet 38, the defroster discharge outlet 40, or the foot discharge outlet (not shown), which is selected depending on a setting of the vehicular air conditioner 10, into the passenger compartment. When the angle of θ by which the air mixing door 18 is angular moved is relatively small, therefore, the cooled air supplied through the first opening 30 to the mixer 36 is led to a region of the mixer 36 near the foot passage 44 by the guide walls 58 on the air mixing door 18.

Figure 4:
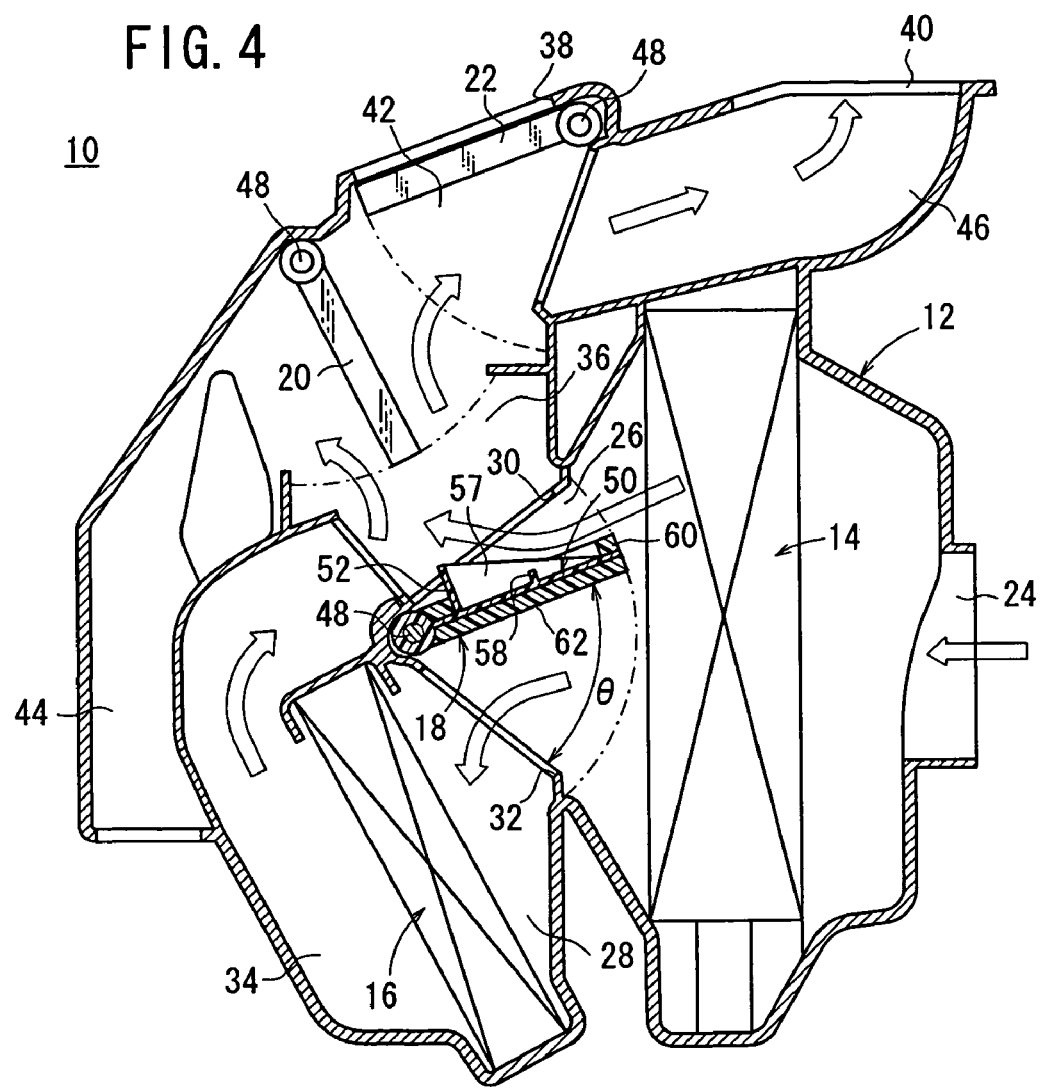
FIG. 4 is a vertical cross-sectional view of the vehicular air conditioner shown in FIG. 1, illustrating the air mixing door set to a large opening size.
Figure 5:
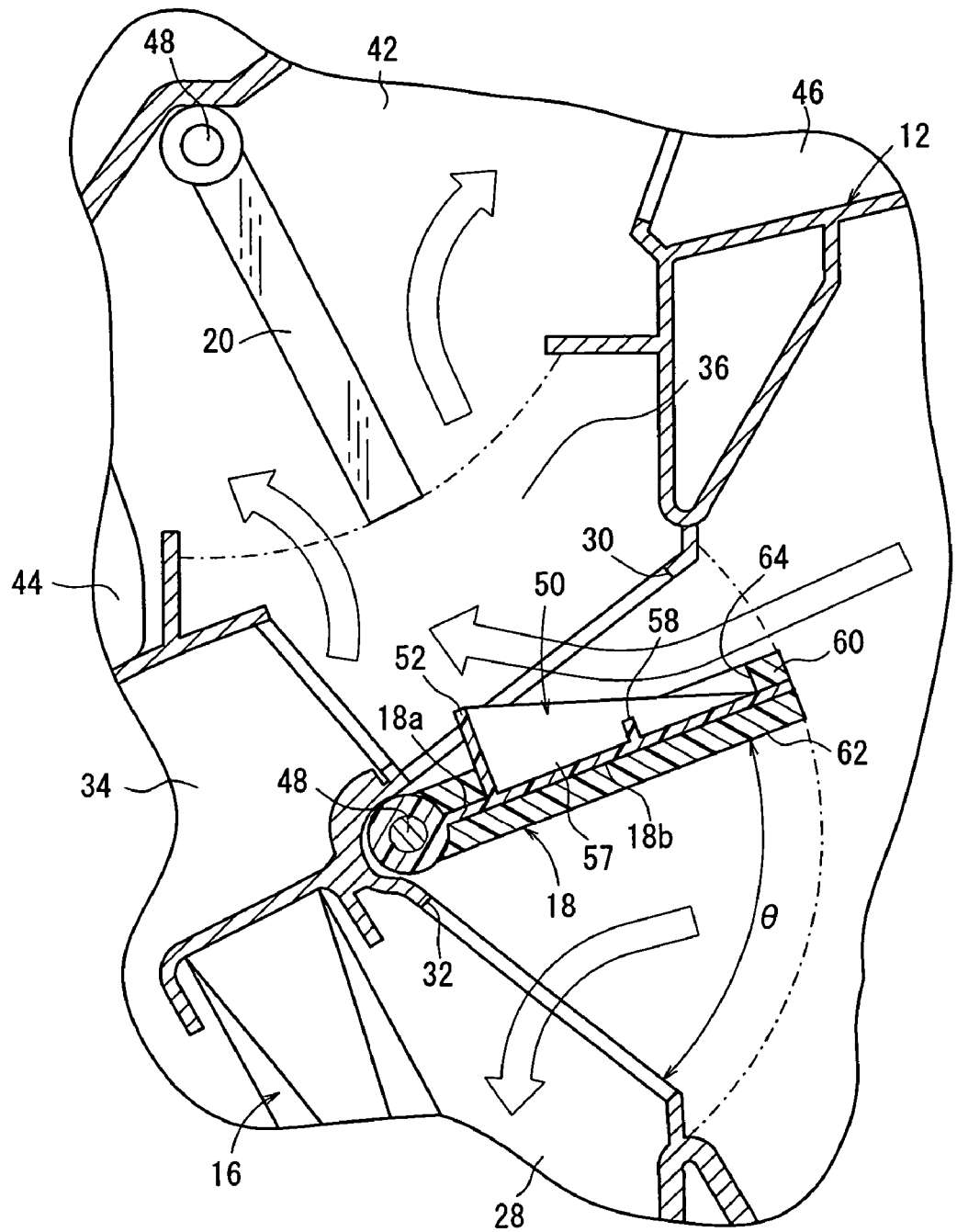
FIG. 5 is an enlarged vertical cross-sectional view of a region near the air mixing door of the vehicular air conditioner shown in FIG. 4.

Next, it is assumed that, as shown in FIGS. 4 and 5, the air mixing door 18 is angularly moved from the second opening 32 toward the first opening 30 by a greater angle of θ than when the air mixing door 18 is angularly moved as shown in FIGS. 1 and 2.

The cooled air that is supplied from the first passage 26 to the air mixing door 18 flows along the surface of the first seal member 60 on the air mixing door 18 which is close to the first opening 30, and is introduced into the guide structure 50 where the cooled air is divided into laminar flows by the third walls 56. At this time, the cooled air flows along the surface of the first seal member 60 into the guide structure 50. Therefore, the cooled air is not affected by the guide walls 58 whose height (projecting distance) is smaller than the thickness of the first seal member 60, but flows smoothly toward the first walls 52. Stated otherwise, the cooled air is less liable to enter the portion of the guide structure 50 which is lower than the first seal member 60, and is not obstructed by the guide walls 58 that are lower than the first seal member 60.

The cooled air then has its direction of flow changed by the first walls 52 closer to the third passage 34 toward the region of the mixer 36 near the foot passage 44. Therefore, when the opening size of the air mixing door 18 is large, the direction of flow of the cooled air is changed once by the first walls 52, causing the cooled air to flow into the mixer 36.

The heated air that flows through the third passage 34 is mixed in the mixer 36 with the cooled air that has flowed through the guide structure 50. The mixed air is then delivered from the face discharge outlet 38, the defroster discharge outlet 40, or the foot discharge outlet (not shown), which is selected depending on a setting of the vehicular air conditioner 10, into the passenger compartment.

When the angle of θ by which the air mixing door 18 is angular moved is large, therefore, the cooled air supplied to the mixer 36 is not affected by the guide walls 58, but the cooled air from the first passage 26 is led through the foot passage 44 to the foot discharge outlet, as with a conventional vehicular air conditioner having an air mixing door which is free of guide walls.

Finally, when the air mixing door 18 is angularly moved to an intermediate position that is angularly spaced equally from the first opening 30 and the second opening 32, the cooled air introduced from the first passage 26 into the guide structure 50 is divided into laminar flows by the third walls 56. Thereafter, the cooled air has its direction of flow changed toward the mixer 36 by the second walls 54 near the first passage 26.

Inasmuch as the first walls 52 and the second walls 54 are alternately interconnected by the third walls 56, the cooled air and the heated air are not directly delivered to the face passage 42 or the foot passage 44. Consequently, the cooled air and the heated air are mixed into an appropriate state. Since the central portions of the third walls 56 project from the air mixing door 18 by a distance smaller than the opposite end portions thereof where the cooled air and the heated air are introduced, the cooled air and the heated air are well mixed with each other in the central region of the guide structure 50.

If, as shown in FIGS. 1 and 4, the vehicular air conditioner 10 is set to a heater defroster mode in which the second discharge outlet door 22 closes the face discharge outlet 38, the first discharge outlet door 20 allows the mixer 36 and the defroster passage 46 to communicate with each other and allows the mixer 36 and the foot passage 44 to communicate with each other, for example, then the mixed air produced by the mixer 36 is delivered through the defroster passage 46 from the defroster discharge outlet 40 into the passenger compartment, and also through the foot passage 44 from the foot discharge outlet into the passenger compartment.

If the vehicular air conditioner 10 is set to a face mode or a bi-level mode in which the second discharge outlet door 22 opens the face discharge outlet 38, the mixed air produced by the mixer 36 is delivered through the face passage 42 from the face discharge outlet 38 into the passenger compartment, and also through the foot passage 44 from the foot discharge outlet into the passenger compartment.

Figure 6:
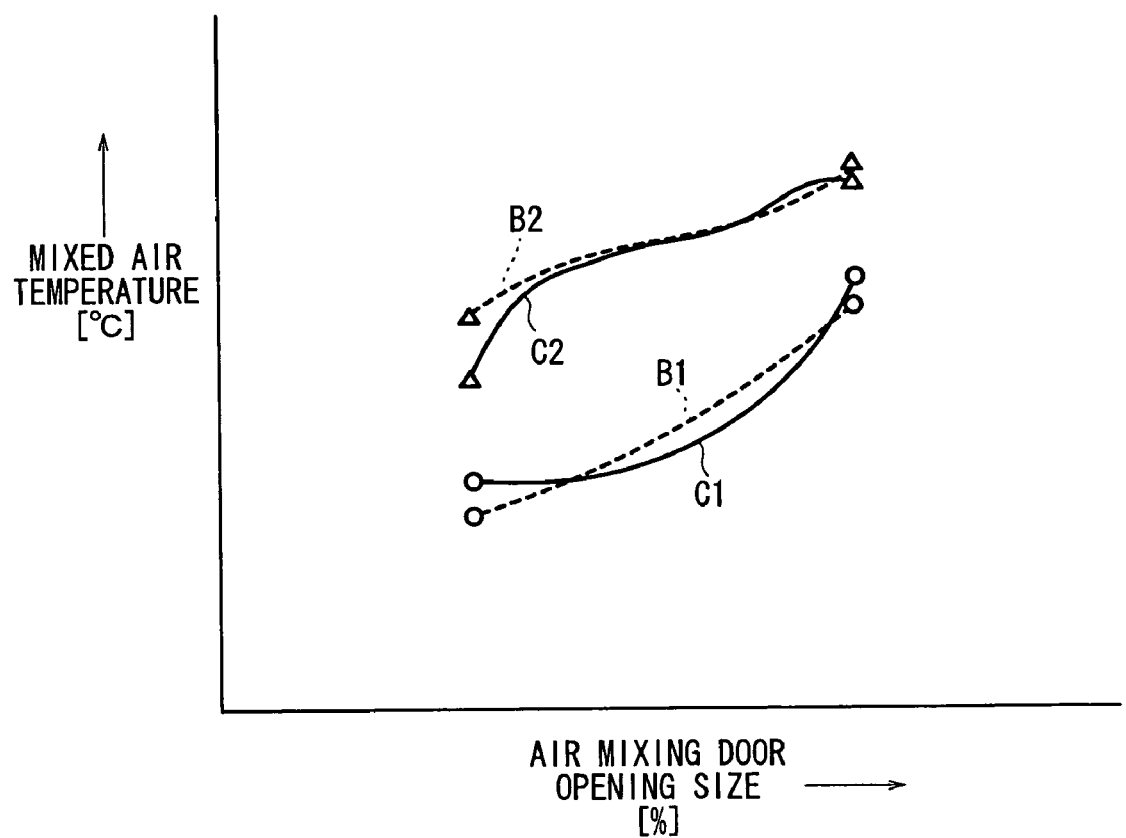
FIG. 6 is a diagram of characteristic curves representing the relationship between the opening size of the air mixing door and the temperature of mixed air delivered into a passenger compartment.

FIG. 6 shows characteristic curves representing the relationship between the temperature of the mixed air delivered from the face discharge outlet 38 and the foot discharge outlet and the opening size of the air mixing door 18 in the bi-level mode in which the mixed air is delivered from the face discharge outlet 38 and the foot discharge outlet into the passenger compartment. The air mixing door 18 is regarded as being fully closed (the opening size: 0%) when it closes the second opening 32, and as fully open (the opening size: 100%) when it closes the first opening 30. Stated otherwise, the angle of θ by which the air mixing door 18 is angularly moved is proportional to the opening size of the air mixing door 18.

In FIG. 6, the broken-line curves B1, B2 show characteristic values representing the temperature of the mixed air discharged from the face discharge outlet 38 and the temperature of the mixed air discharged from the foot discharge outlet, respectively, in the conventional vehicular air conditioner having an air mixing door which is free of guide walls. The solid-line curves C1, C2 show characteristic values representing the temperature of the mixed air discharged from the face discharge outlet 38 and the temperature of the mixed air discharged from the foot discharge outlet, respectively, in the vehicular air conditioner 10 according to the present embodiment which has the guide structure 50 including the guide walls 58 on the air mixing door 18. Specifically, B1, C1 indicate characteristic curves representing the temperature of the mixed air discharged from the face discharge outlet 38, and B2, C2 indicate characteristic curves representing the temperature of the mixed air discharged from the foot discharge outlet.

It can be seen from the characteristic curves shown in FIG. 6 that with the vehicular air conditioner 10 according to the present embodiment which has the guide structure 50 including the guide walls 58 on the air mixing door 18 near the first passage 26, the temperature of the mixed air discharged from the foot discharge outlet is lower than with the conventional vehicular air conditioner.

If the opening size of the air mixing door 18 is large, then the temperature of the mixed air discharged from the foot discharge outlet is substantially the same as the temperature of the mixed air discharged from the foot discharge outlet in the conventional vehicular air conditioner.

According to the present embodiment, as described above, the guide structure 50 for being supplied with the cooled air is disposed on the first surface 18a of the air mixing door 18 which is disposed near the first passage 26 through which the cooled air flows. The guide structure 50 comprises the first walls 52 disposed near the first opening 30, the second walls 54 disposed near the evaporator 14, the third walls 56 interconnecting the first and second walls 52, 54, the pair of fourth walls 57 disposed respectively on the opposite ends of the air mixing door 18, and the pair of guide walls 58 surrounded by the first walls 52, the third walls 56, and the fourth walls 57.

When the air mixing door 18 is angularly moved by a small angle of θ with respect to the second opening 32, the direction of flow of the cooled air is changed stepwise toward the mixer 36 by the guide walls 58 and the first walls 52 of the guide structure 50. Because the direction of flow of the cooled air is changed gradually, the cooled air is delivered to a desired position in the mixer 36 for being mixed with the heated air introduced from the third passage 34.

Since the cooled air can be led in the mixer 36 from the face passage 42 to the foot passage 44 better than the conventional vehicular air conditioner free of guide walls, the temperature of the mixed air flowing through the face passage 42 is prevented from being lowered, but the temperature of the mixed air flowing through the foot passage 44 is lowered appropriately. As a result, the cooled air and the heated air are appropriately mixed with each other by the guide structure 50 on the air mixing door 18. The difference between the temperature of the mixed air delivered from the face discharge outlet 38 or the defroster discharge outlet 40 and the temperature of the mixed air delivered from the foot discharge outlet is reduced, and the passenger compartment is appropriately air-conditioned without making passengers in the passenger compartment feel uncomfortable.

When the air mixing door 18 is angularly moved by a large angle of θ with respect to the second opening 32, since the height of the guide walls 58 is smaller than the thickness H1 of the first seal member 60, the direction of flow of the cooled air flowing along the air mixing door 18 is not changed by the guide walls 58, but the cooled air is led in the mixer 36 to the foot passage 44 in the same manner as with the conventional vehicular air conditioner. As a consequence, the temperature of the mixed air flowing through the foot passage 44 is lowered with respect to the temperature of the mixed air flowing through the face passage 42. The difference between the temperature of the mixed air delivered from the face discharge outlet 38 or the defroster discharge outlet 40 and the temperature of the mixed air delivered from the foot discharge outlet (not shown) is reduced, and the passenger compartment is appropriately air-conditioned without making passengers in the passenger compartment feel uncomfortable.

With the vehicular air conditioner 10 according to the embodiment of the present invention, the guide structure 50 facing the first passage 26 and including the guide walls 58 is disposed on the air mixing door 18. However, the guide structure 50 including the guide walls 58 is not limited to being mounted on the air mixing door 18, but may be mounted on the first discharge outlet door 20 or the second discharge outlet door 22 for desirably controlling the direction of flow of the mixed air that flows through the face passage 42, the foot passage 44, or the defroster passage 46.

The guide walls 58 are not limited to being disposed on the opposite ends of the air mixing door 18 in its longitudinal direction, but may be disposed in respective regions that are surrounded by the first walls 52 and the third walls 56 in confronting relation to the evaporator 14.

Although a certain preferred embodiment of the present invention has been shown and described in detail, it should be understood that various changes and modifications may be made therein without departing from the scope of the appended claims.

What is claimed is:

1. A vehicular air conditioner comprising:
   a cooling unit for cooling air and supplying the cooled air;
   a heating unit for heating air and supplying the heated air;
   an air mixing door for mixing the cooled air and the heated air with each other at a given mixing ratio in a mixer;
   a plurality of outlet ports for discharging mixed air produced by said air mixing door through a discharge outlet door selectively into respective predetermined regions in a vehicle;
   a cooled air passage for leading said cooled air from said cooling unit to said mixer;
   a heated air passage for leading heated air, which is produced by heating the cooled air from said cooling unit with said heating unit, to said mixer;
   seal members mounted respectively on surfaces, which face said cooled air passage and said heated air passage, respectively, of said air mixing door, which is disposed between said cooled air passage and said heated air passage, said seal members being configured to close said cooled air passage and said heated air passage to block fluid communication therebetween when said air mixing door is opened and closed;
   a guide structure disposed on the surface, which faces said mixer, of said air mixing door, for mixing said cooled air and said heated air, said guide structure having a first wall for changing the direction of flow of said cooled air supplied from said cooled air passage and a second wall for changing the direction of flow of said heated air supplied from said heated air passage; and
   a pair of flow guide walls for changing the direction of flow of the cooled air, the pair of flow guide walls being disposed between said first and second walls and projecting from the surface, which faces said mixer, of said air mixing door by a distance which is smaller than the height of said first and second walls and smaller than the thickness of said seal member disposed on the surface, which faces said mixer, of said air mixing door,
   wherein said guide structure includes a third wall interconnecting said first wall and said second wall, and
   each of said pair of guide walls is provided at each longitudinal end of said air mixing door and connected to said third wall.

2. A vehicular air conditioner according to claim 1, wherein said guide structure has said first wall and said second wall that are disposed alternately with each other in a longitudinal direction of said air mixing door.

3. A vehicular air conditioner according to claim 1, wherein said first wall is disposed on said air mixing door near said heated air passage and said second wall is disposed on said air mixing door near said cooled air passage.

4. A vehicular air conditioner according to claim 3, wherein said first wall, said second wall, and said pair of flow guide walls extend parallel to each other.

5. A vehicular air conditioner according to claim 4, wherein said guide wall is provided substantially at a center of said third wall in a longitudinal direction of said third wall.

6. A vehicular air conditioner according to claim 5, wherein said guide structure comprises a labyrinth structure in which said first wall and said second wall are interconnected in a staggered manner by said third wall in a longitudinal direction of said air mixing door.

7. A vehicular air conditioner according to claim 6, wherein the distance by which said third wall projects from the surface, which faces said mixer, is progressively smaller in a direction away from said first wall and said second wall.

* * * * *